United States Patent [11] 3,620,817

[72] Inventor Vincent D. Celentano
 Malvern, Pa.
[21] Appl. No. 788,942
[22] Filed Jan. 3, 1969
[45] Patented Nov. 16, 1971
[73] Assignee General Electric Company

[54] SURFACE PREPARATION ON BORON FILAMENTS FOR ADHESIVE APPLICATIONS
8 Claims, No Drawings

[52] U.S. Cl. ........................................ 117/118,
 117/47 R, 117/72, 117/121
[51] Int. Cl. ........................................ B44d 1/02,
 B44d 1/092
[50] Field of Search .......................... 117/118,
 47, 72, 121

[56] References Cited
UNITED STATES PATENTS
3,466,207  9/1969  Vincent et al. ............... 117/47 X
3,491,055  1/1970  Talley ........................... 117/72 X
3,492,149  1/1970  Zisman et al. ................ 117/47 X
3,492,150  1/1970  Zisman et al. ................ 117/47 X

OTHER REFERENCES

Rauch, H. W., Sr. et al. Ceramic Fibers and Fibrous Composite Materials. N.Y., Academic Press, 1968, p. 126. 117-47.

Primary Examiner—Alfred L. Leavitt
Assistant Examiner—J. R. Batten, Jr.
Attorneys—Paul F. Prestia, Allen E. Amgott, Henery W. Kaufman, William G. Becker, Frank L. Neuhauser and Oscar B. Waddell ABSTRACT: The surface of boron filaments is chemically treated with a polyfunctional organic coupling agent, such as p-xylylene chloride or diglycidyl ether of bis-phenol A, at an appropriate temperature, to enhance its wettability and adhesion to a resinous matrix material.

SURFACE PREPARATION ON BORON FILAMENTS FOR ADHESIVE APPLICATIONS

INTRODUCTION

This invention pertains to the chemical treatment of boron filament to facilitate its incorporation in a resinous matrix.

BACKGROUND OF THE INVENTION

Boron filament is a high modulus, high tensile strength material under development as the reinforcement for composite materials. One of the preferred types of matrices in which it would be desirable to embed boron filament is a resinous material, such as an epoxy. Utilization of the boron filament's high modulus and high-strength in the composite material requires good adhesion between the filament and the matrix in order that applied loads can be transferred from the bulk material to the filament. This in turn requires a strong adhesive bond between filament and matrix.

Heretofore boron filament has not been generally wettable by resinous material and adhesion between boron filament and resinous materials has therefore been less than adequate. This has been one of the factors limiting the strength of boron filament reinforced resinous matrix composite materials.

Among the treating materials which have been the subject of investigation for the purpose of pretreating the boron filament and thereby improving the adhesion of the filament to a resinous matrix are the silane compounds. These compounds have been found to be effective for similar purposes in improving the adhesion of glass filaments to resinous matrices, especially in the presence of moisture. Attempts to utilize these treating or coupling agents with boron filament have generally not been successful, however. In this regard, see for example, AFML-TR-65-319, Research on High Modulus, High Strength Filaments and Composites Thereof; General Electric, Sept. 1965.

OBJECTS OF THE INVENTION

It is therefore an object of the present invention to facilitate an improved adhesive bond between boron filament reinforcement and a resinous matrix in a composite structural material.

It is another object of this invention to enhance the susceptibility of a boron filament surface to wetting by a resinous matrix material.

Still another object of this invention is to provide a process for treating boron filament so as to improve the adhesion thereof to a resinous matrix material.

BRIEF DESCRIPTION OF THE INVENTION

These and other objects are met in accordance with the present invention by the treatment of boron filament with polyfunctional organic coupling agents, such as polyglycidyl ethers, etc., which react with boron oxides or hydroxyl groups on the surface of the boron filament and in turn are free to react with a resinous matrix thereby forming chemically linked bridges between the boron filament and a resinous matrix. Generally, exposure of the filament for a period of time at an elevated temperature is required to effectuate the surface reaction between filament and coupling agent.

DETAILED DESCRIPTION OF THE INVENTION

It has been found that, either as a result of boron filament manufacturing processes or a slow reaction of the boron filament surface in air, boron oxide forms on the surface of boron filament and is hydrolyzed by atmospheric moisture. In the present invention, these oxides and hydroxyl groups on the surface of boron filament are thought to serve as reactive sites for a filament surface reaction with a polyfunctional organic coupling agent. The layer of surface treating or coupling agent thus formed on the boron surface is then able to react chemically with the functional groups of polymeric or resinous matrix materials. The polyfunctionality of the surface treating agent thus provides direct chemical bridging between the boron atoms and the matrix material.

In one example, boron filament was immersed in methylnadic anhydride at about 180° F. for 2 hours and then dried. The wettability of the filament and inferentially the reactivity with and adhesion of the filament to a resinous matrix material was then tested using a resinous mixture designated "68R" and comprised of a mixture of Epon 828 (diglycidyl ether of bisphenol-A as sold by the Shell Chemical Company), Epon 1,031 (a tetraglycidyl ether of tetra phenyl ethane also sold by the Shell Chemical Company), methylnadic anhydride and benzyl dimethyl amine. Filament treated as described and a control sample of untreated filament was immersed briefly in "68R" mixture at 60° C. and the resin then was permitted to cure to 49° C. for 16 hours. By the microscopic observation (using polarized light) of the wetting this chemically treated boron filament surface with the "68R" resin mixture and by microscopic observation of untreated filament immersed in the same resin mixture, the enhanced wettability of the treated filament is clearly demonstrated. In the case of the untreated filament, the resin mixture merely beads on the surface of the filament forming no coating between the resin beads. By contrast a coating of the resin mixture forms on the surface of the treated filament. The formation of this "68R" resin coating is attributed to a reaction between the coupling agent chemically attached to the boron filament surface and the resinous mixture test material. In any event, the improved bondability of the treated boron filament in a matrix of the resin mixture is clearly indicated.

Similar results have been obtained with a variety of other polyfunctional coupling agents including aromatic poly(alkyl halides) (for example an aromatic dialkyl chloride), anhydrides and polyanhydrides of polycarboxylic acids, glycidyl ethers, etc. Examples of each of these groups, treatment time and temperature and wettability of the treated filament, as indicated by microscopic observation, are listed in the following table.

TABLE

| Sample | Treatment conditions | | Wettability with "68R" resin |
| --- | --- | --- | --- |
| | Time, hr. | Temp., °F. | |
| (1) Epon 828 | 2 | 180 | Very good. |
| (2) Epon 828 | 2 | 180 | Do. |
| (3) Maleic Anhydride | 2 | 180 | Good. |
| (4) Maleic anhydride | 2 | 180 | Do. |
| (5) p-Xylylene chloride | 3 | 250 | Very good. |
| (6) p-Xylylene chloride | 3 | 250 | Do. |
| (7) Benzophenone tetracarboxylic dianhydride.[1] | 3 | 250 | Do. |
| (8) Benzophenone tetracarboxylic dianhydride.[1] | 3 | 250 | Do. |
| (9) Epon 1031 | 3 | 250 | Good. |
| (10) Epon 1031 | 3 | 250 | Do. |

[1] The benzophenone tetracarboxylic dianhydride was applied in the form of a saturated solution in N,N-dimethylacetamide.

As may be obvious to those skilled in the art, the present invention provides not only a means for generally improving the adhesion at the boron-resin interface in a boron-resin composite but also provides a means for controlling the mechanical characteristics of that interface by selection of a coupling agent with the desired degree of functionality. For example, a dianhydride such as pyromellitic dianhydride or benzophenone tetracarboxylic dianhydride would be used instead of a monoanhydride such as maleic anhydride or methylnadic anhydride to provide increased functionality at the interface. The result will be a higher cross-link density at the interface with a probable consequent increase in stiffness of the final structure. Mellitic trianhydride is an example for providing still higher functionality at the boron-resin interface.

It should also be obvious to those skilled in the art that while specific treatment temperatures V.D.C. Jan. 2, 1969 and time have been disclosed herein, the present invention is not limited thereto. Entirely different treatment conditions may be required for coupling agents other than those specifically disclosed above and even with the coupling agents specifically disclosed, effective treatment is possible with higher temperature and shorter treatment time or vice versa. Similarly, instead of immersion, spraying or other means may be equally useful to accomplish the desired treatment.

What I claim as new and desire to secure by Letters Patent of the United States is:

1. Process for improving the wettability of a boron surface by a resinous material said process comprising treating the boron surface with a polyfunctional organic coupling agent, selected from the group consisting of polyglycidyl ethers and aromatic poly (alkyl halides).

2. A process such as that recited in claim 1, wherein the polyfunctional organic coupling agent comprises a polyglycidyl ether.

3. A process such as that recited in claim 1, wherein the polyfunctional organic coupling agent comprises the diglycidyl ether of bisphenol-A.

4. A process such as that recited in claim 1, wherein the polyfunctional organic coupling agent comprises tetraglycidyl ether of tetraphenyl ethane.

5. A process such as that recited in claim 1, wherein the polyfunctional organic coupling agent comprises an aromatic dialkyl chloride.

6. A process such as that recited in claim 1, wherein the polyfunctional organic coupling agent comprises xylylene chloride.

7. A process such as that recited in claim 1, wherein said coupling agent is at a temperature of 180–250° F. during said treatment.

8. Boron filament, the surface of which has been chemically treated with a polyfunctional organic coupling agent selected from the group consisting of polyglycidyl ethers and aromatic poly(alkyl hydrides).

* * * * *